(12) United States Patent
Liu

(10) Patent No.: US 9,077,436 B1
(45) Date of Patent: Jul. 7, 2015

(54) PROTECTIVE CASE FOR A MOBILE DEVICE

(71) Applicant: FREE-FREE INDUSTRIAL CORP., Taipei (TW)

(72) Inventor: Sheng-Yu Liu, Taipei (TW)

(73) Assignee: FREE-FREE INDUSTRIAL CORP., Taipei (TW)

( * ) Notice: Subject to any disclaimer, the term of this patent is extended or adjusted under 35 U.S.C. 154(b) by 48 days.

(21) Appl. No.: 14/163,668

(22) Filed: Jan. 24, 2014

(51) Int. Cl.
| | |
|---|---|
| *H04M 1/00* | (2006.01) |
| *H05K 5/00* | (2006.01) |
| *H05K 7/00* | (2006.01) |
| *H04B 1/3888* | (2015.01) |
| *H04M 1/02* | (2006.01) |

(52) U.S. Cl.
CPC ........... *H04B 1/3888* (2013.01); *H04M 1/0206* (2013.01)

(58) Field of Classification Search
USPC .......... 455/575.1, 575.8, 90.3, 347, 348, 349; 361/679.01, 814
See application file for complete search history.

(56) References Cited

U.S. PATENT DOCUMENTS

| | | | | |
|---|---|---|---|---|
| 2008/0096620 | A1* | 4/2008 | Lee et al. | 455/575.8 |
| 2011/0287726 | A1* | 11/2011 | Huang | 455/90.3 |
| 2013/0033806 | A1* | 2/2013 | Rochna | 361/679.01 |
| 2014/0036420 | A1* | 2/2014 | Chen | 361/679.01 |

* cited by examiner

*Primary Examiner* — Nguyen Vo
(74) *Attorney, Agent, or Firm* — Birch, Stewart, Kolasch & Birch, LLP

(57) ABSTRACT

A protective case includes a main body and a frame unit. The main body defines a receiving space and is formed with a lateral opening through which a mobile device is inserted into and received in the receiving space. The frame unit includes an U-shaped frame body having opposite end portions adjacent respectively to top and bottom sides of the main body, and two pivot members, each pivotally interconnecting an end portion of the frame body and a respective top and bottom side of the main body, such that the frame body is pivotable about the main body between a default state, where the frame body covers the lateral opening, and a pivoted state, where the frame body is positioned at an angle relative to the main body.

10 Claims, 6 Drawing Sheets

PROTECTIVE CASE FOR A MOBILE DEVICE

BACKGROUND OF THE INVENTION

1. Field of the Invention

The invention relates to a case, more particularly to a protective case for a mobile device.

2. Description of the Related Art

Nowadays, as mobile communication technology is constantly improving and achieving breakthroughs, almost everyone carries at least one mobile device, such as a mobile phone, a tablet PC, etc.; and often, the more powerful the mobile device becomes, the more expensive it is. In order to effectively protect these expensive mobile devices and reducing the probability of damage from either impact upon dropping or unexpected collision, many users install a protective case.

SUMMARY OF THE INVENTION

Therefore, the object of the present invention is to provide a protective case that can double as a stand.

According to the present invention, there is provided a protective case for a mobile device. The protective case includes a main body and a frame unit.

The main body defines a receiving space and has a lateral side that is formed with a lateral opening through which the mobile device is received in the receiving space, and a front side that is formed with an access hole adapted for exposing a screen of the mobile device.

The frame unit includes an U-shaped frame body and two pivot members. The U-shaped frame body has opposite end portions adjacent respectively to a top side and a bottom side of the main body.

One of the pivot members interconnects pivotally one of the end portions of the frame body and the top side of the main body, whereas the other one of the pivot members interconnects pivotally the other one of the end portions of the frame body and the bottom side of the main body, such that the frame body is pivotable about the main body between a default state, where the frame body covers the lateral opening, and a pivoted state, where the frame body is positioned at an angle relative to the main body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
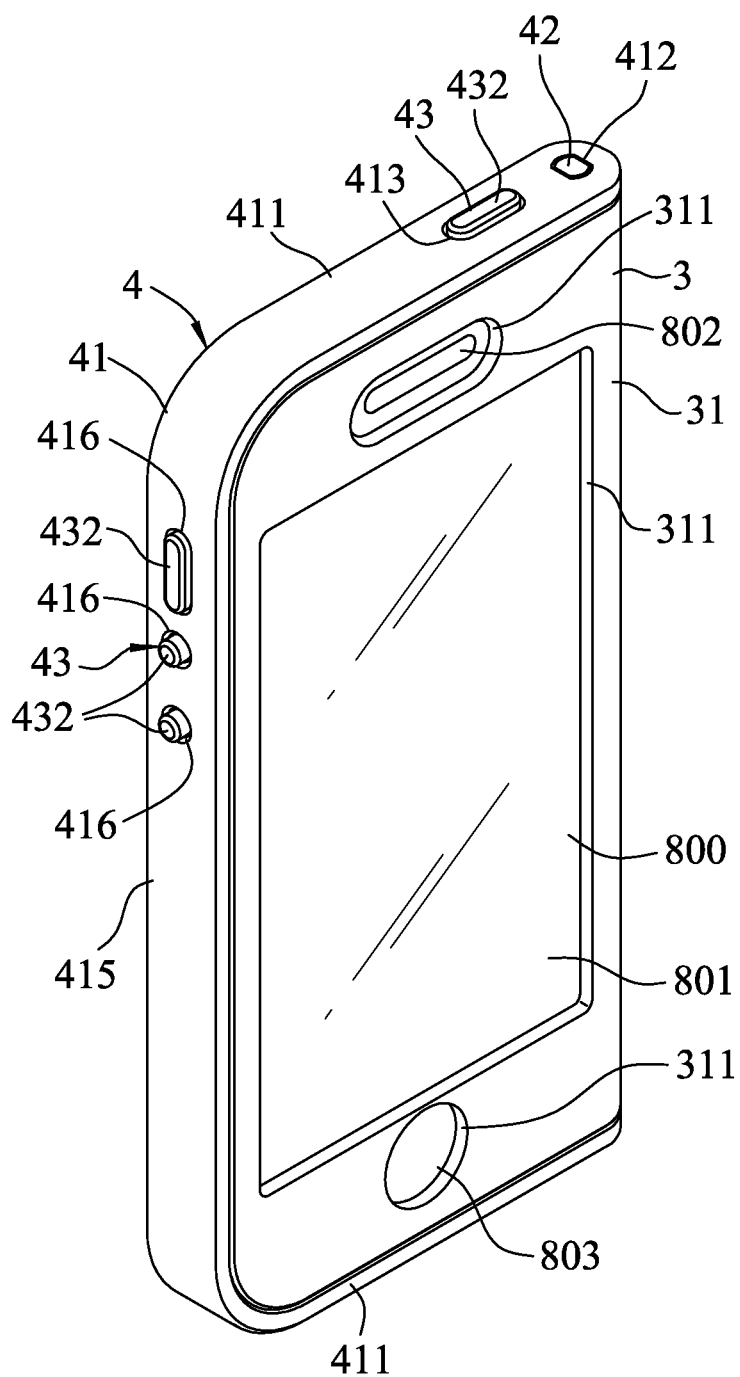
FIG. 1 is a perspective view of a protective case for a mobile device according to the preferred embodiment of the present invention when in use and when a frame unit is disposed in a default state.
Figure 2:
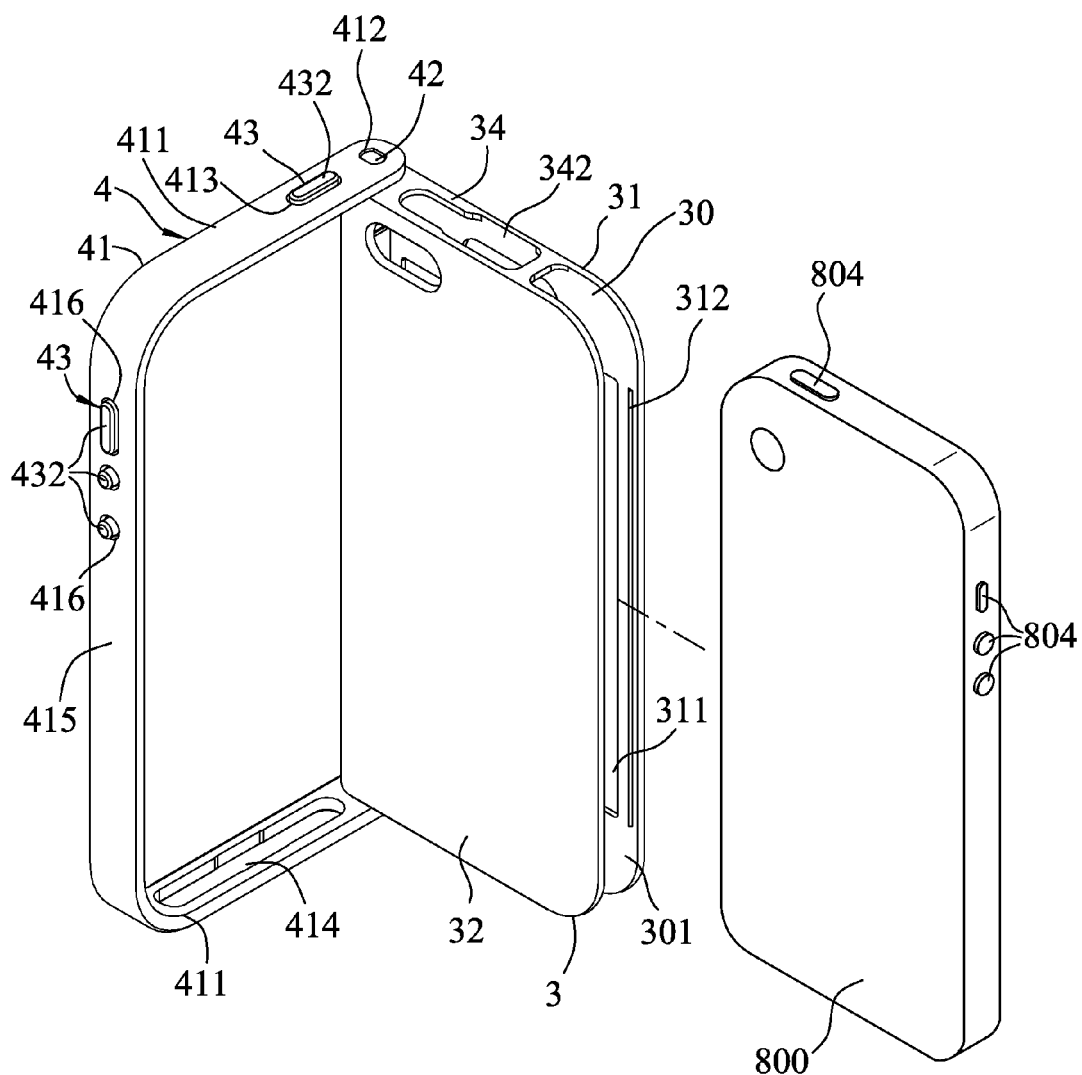
FIG. 2 is a perspective view of the preferred embodiment for illustrating the frame unit disposed in a pivoted state and the mobile device removed therefrom.

Referring to FIGS. 1 and 2, the preferred embodiment of a protective case according to the present invention is shown to be adapted to receive a mobile device 800, such as a mobile phone, a table PC, etc., for providing protection from impact/collision, and further providing a function for allowing the mobile device 800 to stand. In this embodiment, the mobile device 800 is provided with a plurality of operational buttons 804 on top and left sides thereof, and a plurality of terminal jacks 805 (see FIG. 4) formed in a bottom side thereof; and in practice, the structural design of the mobile device 800 is not limited to what is disclosed herein.

Figure 3:
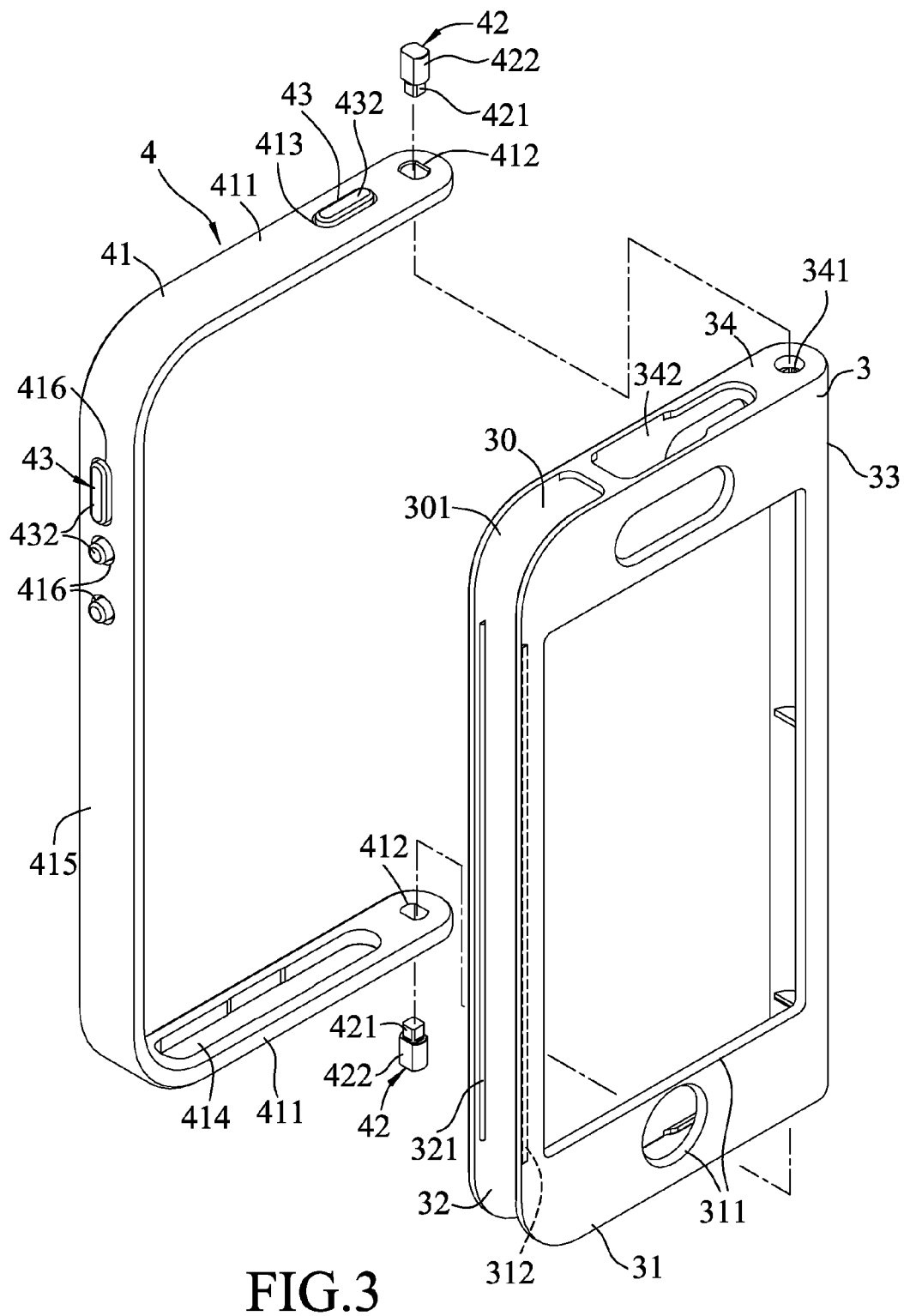
FIG. 3 is a partly exploded perspective view of the preferred embodiment.
Figure 4:
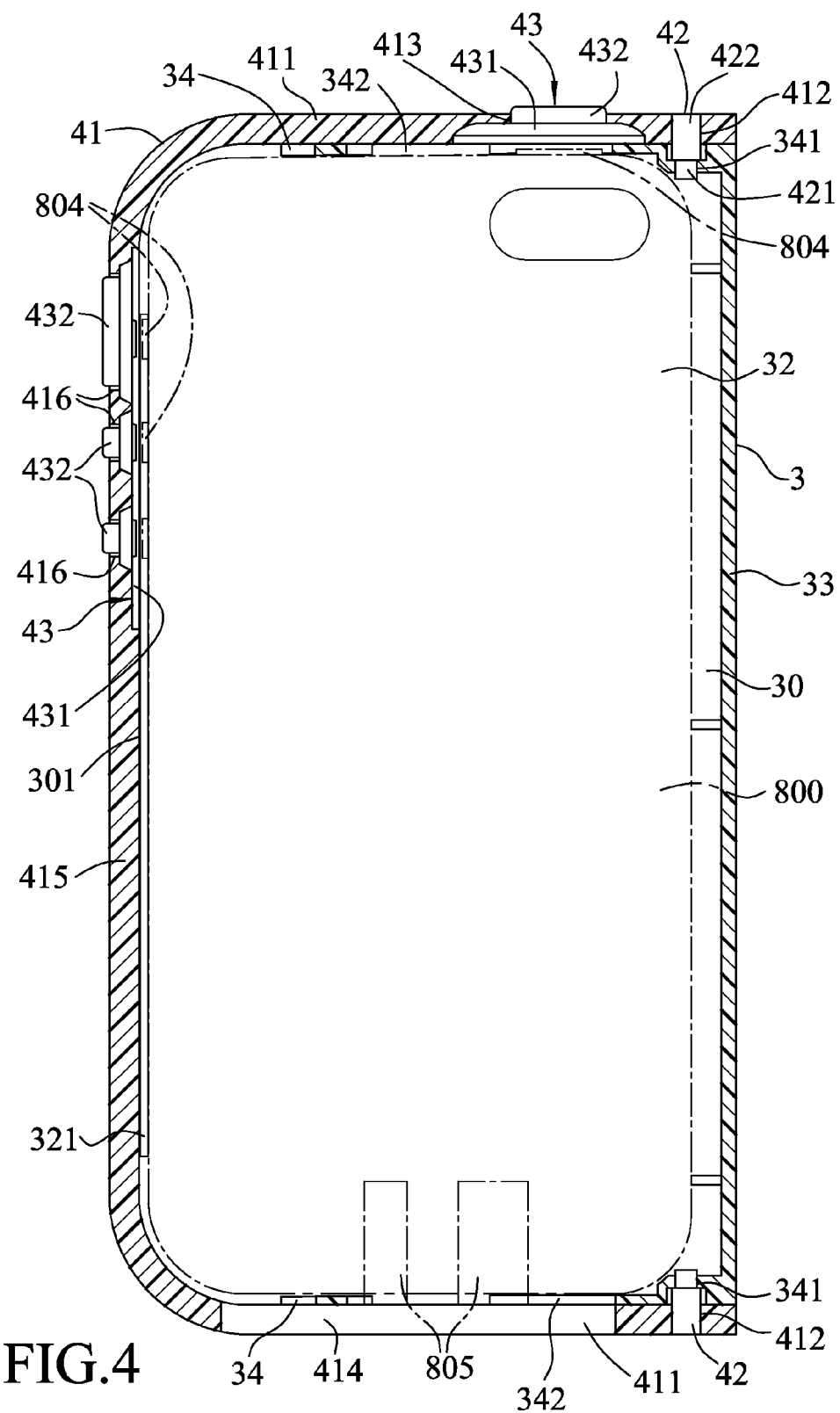
FIG. 4 is a front sectional view of FIG. 1.
Figure 5:
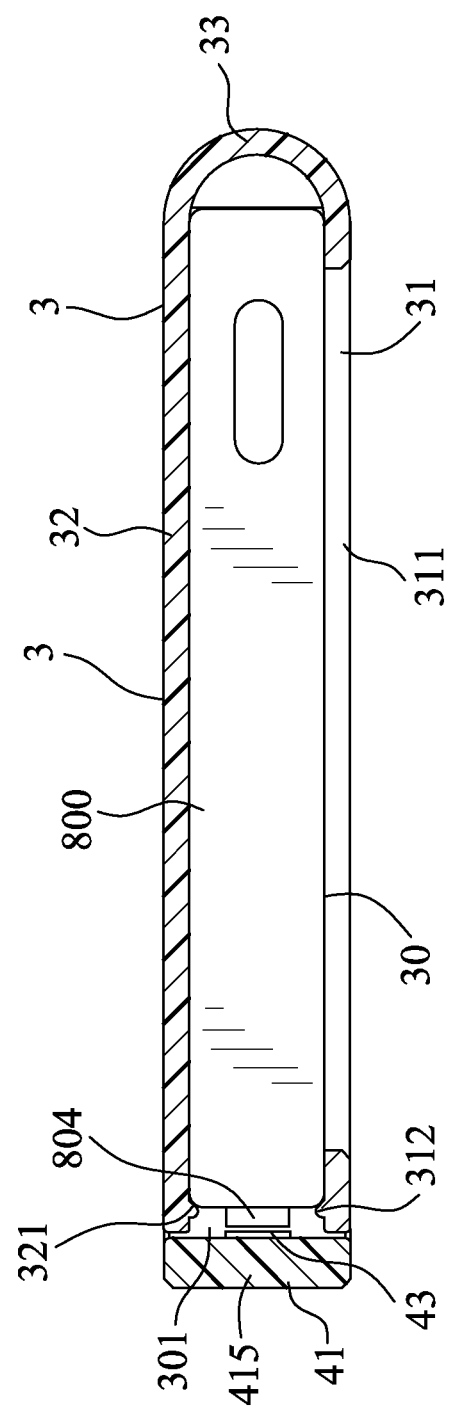
FIG. 5 is a top sectional view of FIG. 1.

With further reference to FIGS. 3 to 5, the protective case includes a main body 3 and a frame unit 4. The main body 3 defines a receiving space 30 and has a lateral side that is formed with a lateral opening 301 through which the mobile device 800 is inserted into and received in the receiving space 301, and a front side that is formed with a plurality of access holes 311 adapted for exposing a screen 801, an audio output hole 802 and a menu button 803 of the mobile device 800. The main body 3 includes a front wall 31, a rear wall 32, a side wall 33 and two pivot walls 34. The front and rear walls 31, 32, the side wall 33 and the pivot walls 34 cooperatively define the receiving space 30.

The front wall 31 is formed with the access holes 311 that are in spatial communication with the receiving space 30, and has opposite top and bottom edges and opposite first and second lateral edges. The rear wall 32 has opposite top and bottom edges, and opposite first and second lateral edges that correspond respectively in position to the first and second lateral edges of the front wall 31. The first lateral edges of the front and rear walls 31, 32 define cooperatively the lateral opening 301.

In this embodiment, the front wall 31 is provided with a first limiting rib 312 and the rear wall 32 is provided with a second limiting rib 321. The first and second limiting ribs 312, 321 extend in a top-bottom direction, project into the receiving space 30, are disposed proximate to the lateral opening 301, and are adapted for abutting against a lateral side of the mobile device 800 so as to prevent the mobile device 800 from falling out of the receiving space 30. It should be noted herein that, it may as well be that only one of the limiting ribs 312, 321 is provided in other embodiments.

The side wall 33 interconnects the second lateral edges of the front and rear walls 31, 32. One of the pivot walls 34 interconnects the top edges of the front and rear walls 31, 32, while the other one of the pivot walls 34 interconnects the bottom edges of the front and rear walls 31, 32. Each of the pivot walls 34 is formed with a through hole 342 that extends in a left-right direction, and a non-circular pivot-receiving hole 341 that is proximate to the side wall 33. The through holes 342 of the pivot walls 34 are provided to expose and make accessible the operational buttons 804 on the top side of the mobile device 800 and the terminal jacks 805 on the bottom side of the mobile device 800 when the mobile device 800 is received in the receiving space 30. In this embodiment, a section of the pivot-receiving hole 341 is quadrangular.

When the mobile device 800 is received in the receiving space 30, the front wall 31 and the rear wall 32 abut closely and respectively against front and rear sides of the mobile device 800 while the pivot walls 34 abut against the top and bottom sides of the mobile device 800, and the first and second limiting ribs 312, 321 abut against a lateral side of the mobile device 800 for limiting the mobile device 800 within the receiving space 30 without falling out of the lateral opening 301.

The frame unit 4 includes an U-shaped frame body 41 having opposite end portions adjacent respectively to top and bottom sides of the main body 3, two pivot members 42 and at least one button subunit 43. The frame body 41 is divided into two pivot sections 411 respectively at the end portions and respectively adjacent to the pivot walls 34 of the main body 3, and a side section 415 interconnecting the pivot sections 411 and blocking the lateral opening 301 when the frame body 41 is in a default state. A right end portion of each of the pivot sections 411 is formed with a non-circular insert hole 412 that is registered with the pivot-receiving hole 341 in the corresponding one of the pivot walls 34. Moreover, the top one of the pivot sections 411 is further formed with a mounting hole 413, and the bottom one of the pivot sections 411 is further formed with a terminal hole 414 that is registered with the through hole 342 in the corresponding one of the pivot walls 34. In this embodiment, the insert hole 412 has a substantially oval shape. The side section 415 is formed with a plurality of mounting holes 416 spaced apart from one another in the top-bottom direction.

The pivot members 42 are connected pivotally between the pivot walls 34 and the frame body 41. In detail, one of the pivot members 42 interconnects pivotally one of the end portions of the frame body 41 and the top side of the main body 3, while the other one of the pivot members 42 interconnects pivotally the other one of the end portions of the frame body 41 and the bottom side of the main body 3, such that the frame body 41 is pivotable about the main body 3 between the default state (see FIG. 1), where the frame body 41 covers the lateral opening 301, and a pivoted state (see FIG. 6), where the frame body 41 is positioned at an angle relative to the main body 3.

In this embodiment, the pivot members 42 are configured as friction hinges. Each of the pivot members 42 includes a first pivot portion 421 fixed non-rotatably to the respective one of the pivot walls 34, and a second pivot portion 422 fixed non-rotatably to the pivot section 411 at the respective one of the end portions of the frame body 41. The first and second pivot portions 421, 422 are connected pivotally to each other and are coaxially rotatable by 360 degrees along an axis thereof. A cross-section of each of the first and second pivot portions 421, 422 has a non-circular shape. In this embodiment, the cross-section of the first pivot portion 421 is quadrangular whereas the cross-section of the second pivot portion 422 is substantially oval.

The first pivot portion 421 of each of the pivot members 42 is fittingly inserted into the pivot-receiving hole 341 in the corresponding one of the pivot walls 34, and the second pivot portion 422 is fittingly inserted into the insert hole 412 in the corresponding one of the pivot sections 411.

Figure 6:
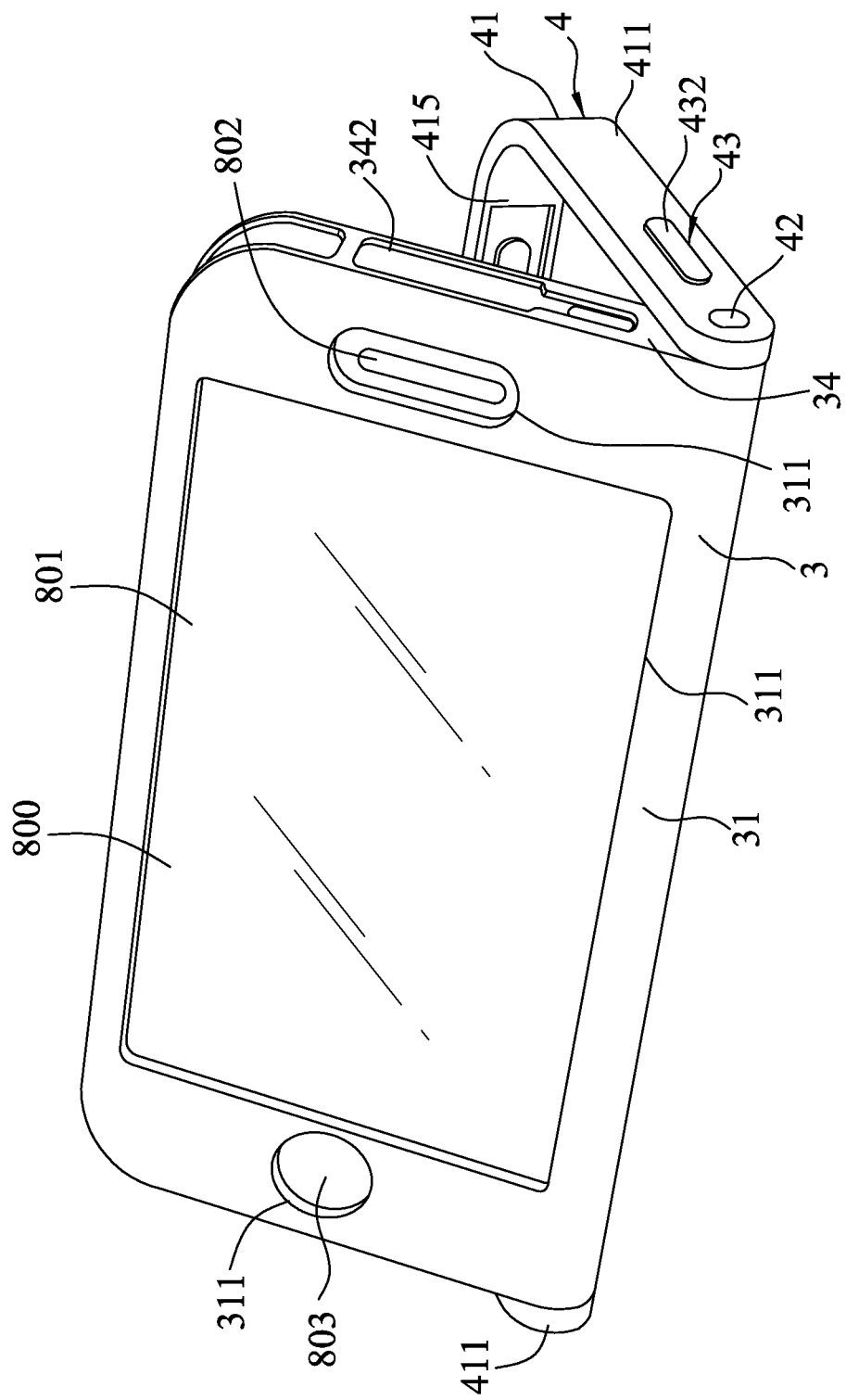
FIG. 6 is a perspective view of the preferred embodiment when in use and when the frame unit is in the pivoted state.

By the structural design of the pivot members 42 (configured as friction hinges as previously mentioned) where each of the pivot members 42 is extended into a corresponding pivot wall 34 of the main body 3 and pivot section 411 of the frame body 41, the frame body 41 is pivotable relative to the main body 3 between the default state (see FIG. 1) and the pivoted state (see FIG. 6). In addition, the frame body 41 is pivotable relative to the main body 3 by 360 degrees and can be positioned at various angles by the torsional resistance between the first and second pivot portions 412, 422 of the pivot members 42.

Since there are various implementations that enable the pivoting of the frame body 41 relative to the main body 3, and the positioning of the frame body 41 at various angles relative to the main body 3, the implementation of the pivot members 42 is not limited to the disclosed friction hinges.

In this embodiment, there are a plurality of the button subunits 43. The button subunits 43 are provided on an inner side of the frame body 41 at the top pivot section 411 and the side section 415 respectively, and are respectively operable for actuating the operational buttons 804 of the mobile device 800. Each of the button subunits 43 has a resilient plate 431 fixedly mounted on the inner side of the frame body 41 facing the main body 3, and a button member 432 that is fixedly mounted on the plate 431, that is exposed from the respective mounting hole 413 or 416 and that is depressible relative to the plate 431 for pushing the respective operational button 804 of the mobile device 800. Since the button subunits 43 are well-known, the same will not be further detailed hereinafter.

As shown in FIGS. 1, 4 and 6, when the preferred embodiment of the protective case of this invention is put in use, after the mobile device 800 is received in the receiving space 30, the frame body 41 can be pivoted to the default state (see FIG. 1) to surround the top, bottom and lateral sides of the main body 3. During this time, the button subunits 43 of the frame unit 4 are registered with the corresponding operational buttons 804 of the mobile device 800, the terminal hole 414 is registered and in spatial communication with the terminal jacks 805 of the mobile device 800, and the front side of the screen 801, the audio output hole 802 and the menu button 803 of the mobile device 800 are respectively exposed from the access holes 311 in the front wall 31. Thus, a user only needs to press the button member 432 corresponding to the desirable operational button 804 to operate the same, and can plug any other component into the terminal jacks 805 for data transmission, power charging, etc., through the terminal hole 414 and the corresponding through hole 342 without the need to remove the mobile device 800 from the protective case, which is very convenient.

Furthermore, through the design of the pivot members 42 of the frame unit 4, the main body 3 and the frame body 41 are pivotable relative to each other for positioning, such that when the mobile device 800 is needed to stand in a horizontal position, the frame unit 4 can be pivoted from the default state to the pivoted state, and the frame body 41 can be used as a base to support the mobile device 800 on a flat surface (shown in FIG. 6), thereby allowing a user to watch the screen 801 of the mobile device 800 without the need to hold it and keep it steady by hand. The positioning angles of the frame body 41 relative to the main body 3 are adjustable at will, which is rather convenient.

In this embodiment, the front wall 31 is formed with three access holes 311, each with its respective size and appearance, different from one another. However, in practice, the number and design of the access holes 311 are not limited to what is disclosed herein, and the number may as well be one.

In summary, through the structural design of the pivot connection between the main body 3 and the frame unit 4, apart from accommodating and protecting the mobile device 800, the mobile device 800 can easily be supported at any angle with ease.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A protective case adapted for accommodating a mobile device, said protective case comprising:

a main body defining a receiving space and having a lateral side that is formed with a lateral opening through which the mobile device is inserted and received in said receiving space, and a front side that is formed with an access hole adapted for exposing a screen of the mobile device; and a frame unit including an U-shaped frame body that has opposite end portions adjacent respectively a top side and a bottom side of said main body, and two pivot members, one of said pivot members interconnecting pivotally one of said end portions of said frame body and said top side of said main body, and the other one of said pivot members interconnecting pivotally the other one of said end portions of said frame body and said bottom side of said main body, such that said frame body is pivotable about said main body between a default state, where said frame body covers said lateral opening, and a pivoted state, where said frame body is positioned at an angle relative to said main body.

2. The protective case as claimed in claim 1, wherein said main body includes:
   a front wall formed with said access hole and having opposite top and bottom edges and opposite first and second lateral edges;
   a rear wall having opposite top and bottom edges, and opposite first and second lateral edges that correspond respectively in position to said first and second lateral edges of said front wall, said first lateral edges of said front and rear walls defining cooperatively said lateral opening; and
   a side wall interconnecting said second lateral edges of said front and rear walls, and
   two pivot walls, one of said pivot walls interconnecting said top edges of said front and rear walls, the other one of said pivot walls interconnecting said bottom edges of said front and rear walls, said front, rear, side and pivot walls cooperatively defining said receiving space, said pivot members being connected pivotally between said pivot walls and said frame body.

3. The protective case as claimed in claim 2, wherein one of said front and rear walls of said main body is provided with a first limiting rib that projects into said receiving space, that is disposed proximate to said lateral opening, and that is adapted for abutting against a lateral side of the mobile device so as to prevent the mobile device from falling out of said receiving space.

4. The protective case as claimed in claim 3, wherein said first limiting rib extends in a top-bottom direction.

5. The protective case as claimed in claim 3, wherein the other one of said front and rear walls of said main body is provided with a second limiting rib that projects into said receiving space, that is disposed proximate to said lateral opening, and that is adapted for abutting against the lateral side of the mobile device so as to cooperate with said first limiting rib to prevent the mobile device from falling out of said receiving space.

6. The protective case as claimed in claim 5, wherein said first and second limiting ribs extend in a top-bottom direction.

7. The protective case as claimed in claim 2, wherein:
   said frame body of said frame unit has
      two pivot sections respectively at said end portions and respectively adjacent to said pivot walls of said main body, and
      a side section interconnecting said pivot sections and blocking said lateral opening when said frame body is in the default state; and
   each of said pivot members includes a first pivot portion fixed non-rotatably to a respective one of said pivot walls, and a second pivot portion connected pivotally to said first pivot portion and fixed non-rotatably to a respective one of said pivot sections of said frame body.

8. The protective case as claimed in claim 1, wherein said pivot members are configured as friction hinges.

9. The protective case as claimed in claim 1, wherein said frame unit further includes a button subunit provided on said frame body and operable for controlling the mobile device.

10. The protective case for a mobile device as claimed in claim 9, wherein a periphery of the mobile device is provided with at least one operational button, said frame body being formed with amounting hole, said button subunit having a resilient plate that is fixedly mounted on an inner side of said frame body facing said main body, and at least one button member that is fixedly mounted on said plate, that is exposed from said mounting hole, and that is depressible relative to said plate for deforming said plate to push the operational button of the mobile device.

\* \* \* \* \*